United States Patent Office 2,745,841
Patented May 15, 1956

2,745,841

THE METHYLENEBIS DERIVATIVE OF N-CARBAMYLMALEIMIDE

Pliny O. Tawney, Passaic, and Robert J. Kelly, Clifton, N. J., assignors to United States Rubber Company, New York, N. Y., a corporation of New Jersey No Drawing. Application October 27, 1954,
Serial No. 465,138

1 Claim. (Cl. 260—326.3)

This invention relates to preparation of a new chemical, denoted methylenebis-(N-carbamylmaleimide) represented by the formula

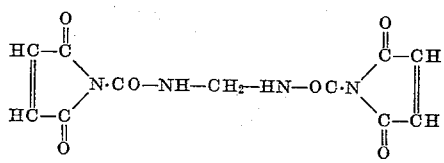

The new chemical is derived from N-carbamylmaleimide which is described in Snyder application, Serial No. 367,108, filed July 9, 1953.

According to the invention, we have found that the said methylenebis-(N-carbamylmaleimide) can be prepared directly by the interaction of N-carbamylmaleimide with paraformaldehyde, formalin, or other formaldehyde-yielding materials, in accordance with the following scheme:

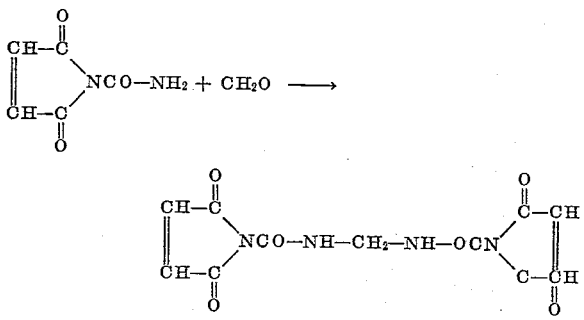

According to the aforementioned copending application Serial No. 367,108, the N-carbamylimides are derived from the interaction of an N-carbamylamic acid and an acid anhydride of a saturated aliphatic monocarboxylic acid having from two to four carbon atoms; i. e., a non-cyclic acid anhydride. The reaction for making the specific N-carbamylimide used in our invention, N-carbamylmaleimide, is represented as follows:

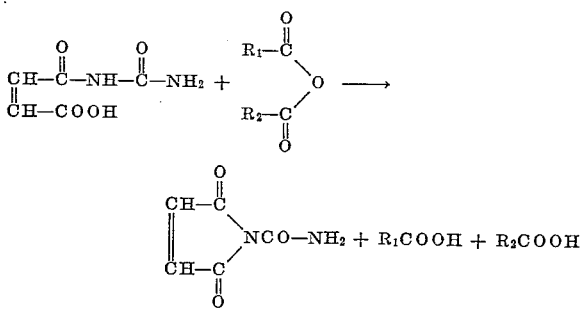

where each of $R_1$ and $R_2$ is an alkyl radical having not more than three carbon atoms.

The preferred method of making N-carbamylmaleimide is as follows. The N-carbamylmaleamic acid is made in any known manner, but preferably by the method outlined in copending application of Snyder, Serial No. 312,869, filed October 2, 1952.

A mixture of 50 parts of N-carbamylmaleamic acid and 120 parts of glacial acetic acid is heated to about 80° C.; 50 parts of acetic anhydride is added gradually to the stirred mixture, which is held at the same temperature until practically all of the suspended N-carbamylmaleamic acid has disappeared. The hot solution is filtered, and cooled to room temperature, causing crystallization of a white product.

This material, N-carbamylmaleimide, melts at 157–158° C. The yield is 41 parts (92.5% of theory).

The N-carbamylmaleimide made according to the foregoing description is then reacted with paraformaldehyde or formalin to prepare the methylenebis-(N-carbamylmaleimide) according to our invention. The following example will illustrate the preparation of the methylenebis-(N-carbamylmaleimide) in detail.

Example 1

Concentrated sulfuric acid (3600 g.) was cooled to −5° C. N-carbamylmaleimide (840 g.) was added very slowly, with stirring, the addition taking about ¾ of an hour. With the temperature still near −5° C., paraformaldehyde (90 g.) was added slowly with stirring over a fifteen-minute period. Stirring was continued at 0° C. for 2 hours, after which the entire batch was quenched in 9000 g. of an ice and water mixture and filtered immediately. The filter cake was washed three times with ice water and then set aside to air-dry. The melting point of this dried crude material was ca. 170° C. The entire product (345 g.) was heated to 100° C. with 4000 g. of acetic acid and 400 g. of acetic anhydride to dissolve it; then filtered and set aside to cool. The recrystallized material was then filtered off. The yield was 205 g. (22% of theory) of methylenebis-(N-carbamylmaleimide) which melted at 212–214° C.

Analysis:

|  | Calcd. for $C_{11}H_8O_6N_4$ | Found |
|---|---|---|
| Carbon_____percent__ | 45.2 | 45.53 |
| Hydrogen_____do____ | 2.76 | 2.92 |
| Nitrogen_____do____ | 19.1 | 18.50 |
| Neutral Equivalent_____ | 146.0 | 146.8 |

Example 1 represents the preferred method of making the methylenebis-(N-carbamylmaleimide) from N-carbamylmaleimide, i. e., by the use of paraformaldehyde rather than formalin or other formaldehyde-yielding material, and by recrystallizing the product from acetic acid after washing with ice water. The use of formalin is less desirable because of the substantial evolution of heat and consequent raising of the temperature of the reactant mixture. This leads to a considerable amount of side reaction, hence lowering the yield of the desired product. Acetic acid has been found to be the best recrystallizing agent for the compound, although other materials, dioxan for example, may be used for this purpose. However, washing and/or recrystallizing with dioxan leads to molecular addition product containing a mole-for-mole ratio of dioxan and the methylenebis-(N-carbamylmaleimide).

Methylenebis-(N-carbamylmaleimide) is useful as an intermediate in making N-carbamylmaleamate esters, which in turn are useful in making casting resins, and protective coatings and films, as shown in the following examples.

Example 2

A mixture of 5.84 g. of methylenebis-(N-carbamylmaleimide), 50 ml. of methanol and 0.27 g. of zinc chloride was refluxed on a steam bath for 2 hours. The hot solution was filtered to remove a little unreacted material. The filtrate was cooled to cause the white product, methylenebis-(methyl N-carbamylmaleamate) to crystallize. The yield was 4.9 g. It melted at 167-9° C. After recrystallization from water it melted at 170-1° C. (with decomposition).

Analysis:

|  | Calcd. for $C_{13}H_{16}O_8N_4$ (percent) | Found (percent) |
|---|---|---|
| Carbon | 43.7 | 44.06 |
| Hydrogen | 4.48 | 4.55 |
| Nitrogen | 15.63 | 15.69 |

*Example 3*

A mixture of 5.84 g. of methylenebis-(N-carbamylmaleimide), 35.2 g. of n-butanol and 0.27 g. of zinc chloride was heated on a steam bath for 3 hours. The white product, methylenebis-(n-butyl N-carbamylmaleamate) was separated as shown in Example 2. The yield was 2.73 g. It melted at 115-7° C. After recrystallization from methanol it melted at 119.5-120.5° C.

Analysis:

|  | Calcd. for $C_{19}H_{28}O_8N_4$ (percent) | Found (percent) |
|---|---|---|
| Carbon | 51.8 | 51.83 |
| Hydrogen | 6.39 | 6.41 |
| Nitrogen | 12.7 | 12.48 |

*Example 4*

A mixture of 5.84 g. of methylenebis-(N-carbamylmaleimide), 7.5 g. of n-dodecanol, 0.3 g. of zinc chloride and 50 ml. of nitromethane was heated on a steam bath for 5 hours. The clear, hot solution was cooled to cause the white product, methylenebis-(n-dodecyl N-carbamylmaleamate), to crystallize. The yield was 11.5 g. After recrystallization from 95% ethanol it melted at 116-8° C.

Analysis:

|  | Calcd. for $C_{35}H_{60}O_8N_4$ (percent) | Found (percent) |
|---|---|---|
| Carbon | 63.3 | 63.35 |
| Hydrogen | 9.10 | 9.08 |
| Nitrogen | 8.43 | 8.12 |

*Example 5*

A stirred mixture of 10.0 g. of methylenebis-(N-carbamylmaleimide), 3.56 g. of freshly distilled pentamethylene glycol, 100 ml. of nitromethane and 0.1 g. of zinc chloride was heated on a steam bath for 7.5 hours. The originally clear yellow solution began depositing a solid material within the first 2 hours heating. Additional solid appeared throughout the heating. The supernatant liquid then was decanted. The yellow solid was washed with methanol and then with ether. A second crop of the yellow solid separated from the cooled supernatant nitromethane solution. Both crops softened and partially melted at about 70-100° C. The first crop was dried thoroughly in vacuo, and analyzed.

Analysis:

|  | Calcd. for 1:1 molar adduct (percent) | Found (percent) |
|---|---|---|
| Carbon | 48.4 | 48.23 |
| Hydrogen | 5.08 | 5.29 |
| Nitrogen | 14.05 | 13.73 |

Intrinsic viscosity, in dimethyl formamide, was 0.10.

It is evident that methylenebis-(N-carbamylmaleimide) and pentamethylene glycol reacted equimolecularly to form a long-chain, poly-(N-carbamylmaleamate) wherein the two reagents alternate with each other in forming the chain.

The formation of the N-carbamylmaleamate esters shown in Examples 2-5 is analogous to the formation of N-carbamylmaleamate esters from N-carbamylmaleimide and non-tertiary alcohols. The latter reaction is described in detail in a copending application of Snyder and Tawney, Serial No. 395,281, filed November 30, 1953. The use of zinc chloride to accelerate the formation of such esters is shown in Tawney copending application, Serial No. 395,283, filed November 30, 1953.

The esters of Examples 2-5 can be homopolymerized or copolymerized in the presence of a free-radical source, e. g., an organic peroxide or hydroperoxide, N,N'-azobis-(isobutyronitrile) or ultra violet light, to form useful casting resins. The comonomers used in making copolymers are those which have one or more vinyl groups, —CH=CH$_2$, e. g., styrene, vinyl acetate, etc. The polymers, and particularly the copolymers, also are useful as protective coatings and films which are insoluble and infusible. The polymerization reactions are analogous to those described in Tawney copending application, Serial No. 395,282, filed November 30, 1953, wherein the polymerization of N-carbamylmaleamate esters made from N-carbamylmaleimide is shown. However, all of the methylenebis-(N-carbamylmaleamate) esters can form insoluble, infusible resins on homopolymerization or copolymerization with monovinyl compounds, whereas only the esters made from N-carbamylmaleimide and a polyhydric alcohol can form such resins.

Having thus described our invention, what we claim and desire to protect by Letters Patent is:

A compound represented by the formula

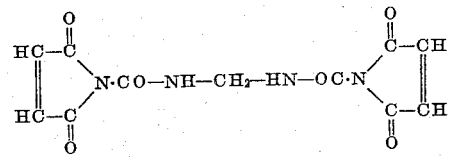

No references cited.